United States Patent [19]
Yamamoto

[11] Patent Number: 5,923,559
[45] Date of Patent: Jul. 13, 1999

[54] MAGNETIC BEARING APPARATUS

[75] Inventor: Masayuki Yamamoto, Narashino, Japan

[73] Assignee: Seiko Seiki Kabushiki Kaisha, Japan

[21] Appl. No.: 08/836,234

[22] PCT Filed: Aug. 30, 1996

[86] PCT No.: PCT/JP96/02452

§ 371 Date: Apr. 29, 1997

§ 102(e) Date: Apr. 29, 1997

[30] Foreign Application Priority Data

Aug. 31, 1995 [JP] Japan .................................. 7-223793

[51] Int. Cl.$^6$ ......................... G06F 19/00; G06G 7/6466
[52] U.S. Cl. ............................... 364/474.12; 364/474.15; 364/474.16
[58] Field of Search ....................... 364/474.12, 474.13, 364/471.14, 474.15, 474.16; 310/90.5, 67 R, 68 B, 51; 324/207.25, 207.11; 318/623, 632, 611; 361/146

[56] References Cited

U.S. PATENT DOCUMENTS

| | | | |
|---|---|---|---|
| 4,537,565 | 8/1985 | Edler | 417/413 |
| 4,878,813 | 11/1989 | Miki | 417/2 |
| 5,382,900 | 1/1995 | Hayashi | 324/207 |
| 5,454,921 | 10/1995 | Kogure et al. | 204/199 |
| 5,486,729 | 1/1996 | Matsushita et al. | 310/90.5 |
| 5,491,396 | 2/1996 | Takahashi et al. | 318/632 |
| 5,530,306 | 6/1996 | Ueyama | 310/90.5 |
| 5,543,673 | 8/1996 | Katsumata et al. | 310/90.5 |
| 5,576,587 | 11/1996 | Takahashi et al. | 310/90.5 |
| 5,729,066 | 3/1998 | Soong et al. | 310/90.5 |
| 5,760,511 | 6/1998 | Nakagawa et al. | 310/90.5 |

*Primary Examiner*—William Grant
*Assistant Examiner*—Ramesh Patel
*Attorney, Agent, or Firm*—Adams & Wilks

[57] ABSTRACT

A magnetic bearing apparatus comprises a first magnetic bearing for levitating a rotary body by magnetic attraction forces in an axial direction thereof and a second magnetic bearing for levitating the rotary body by magnetic attraction forces in a radial direction thereof. A first detecting device detects axial displacement of the rotary body and outputs a first detection signal corresponding to the detected axial displacement of the rotary body. A second detecting device detects radial displacement of the rotary body and outputs second detection signals corresponding to the detected radial displacement of the rotary body. A first A/D conversion device converts the first detection signal to a first digital signal at a first conversion speed. A second A/D conversion device converts the second detection signals to second digital signals at a second conversion speed different from the first conversion speed. A calculating device calculates control currents on the basis of the first and second digital signals for controlling the axial and radial direction electromagnets to levitate the rotor in the axial and radial directions at a preselected target position.

16 Claims, 11 Drawing Sheets

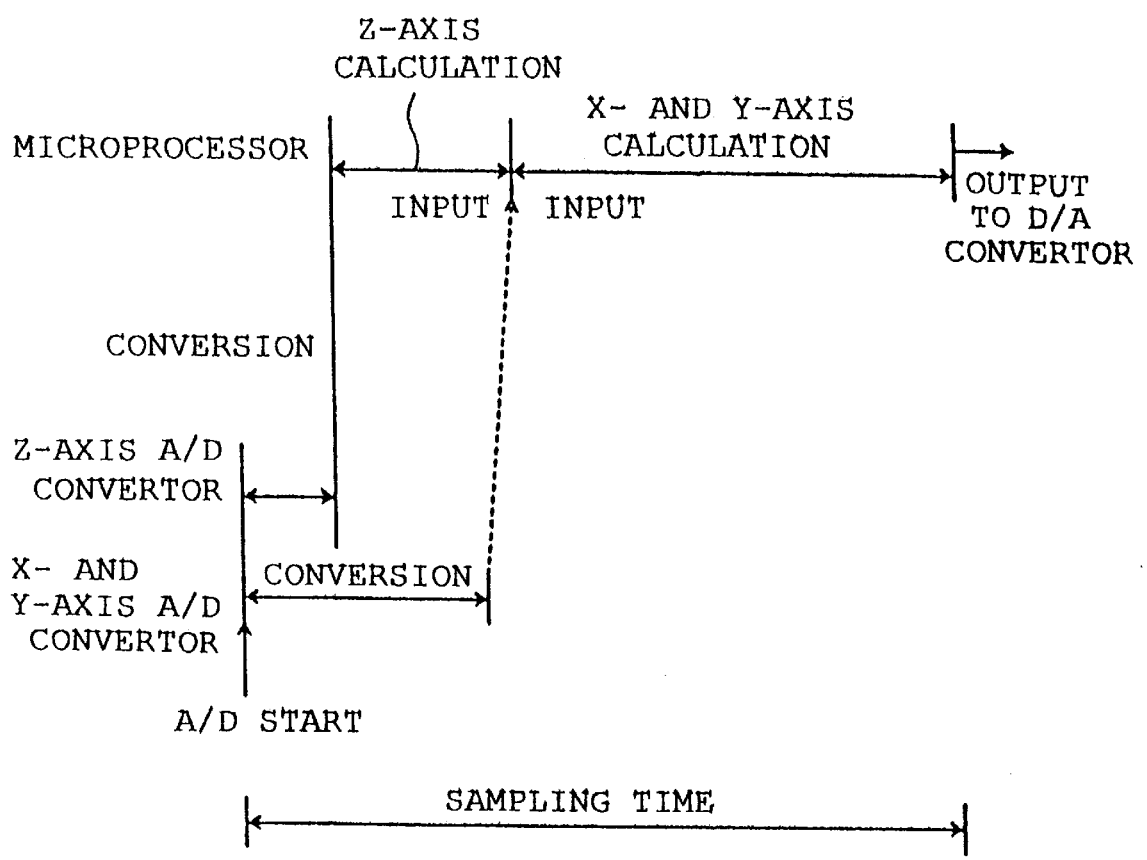
F I G. 3

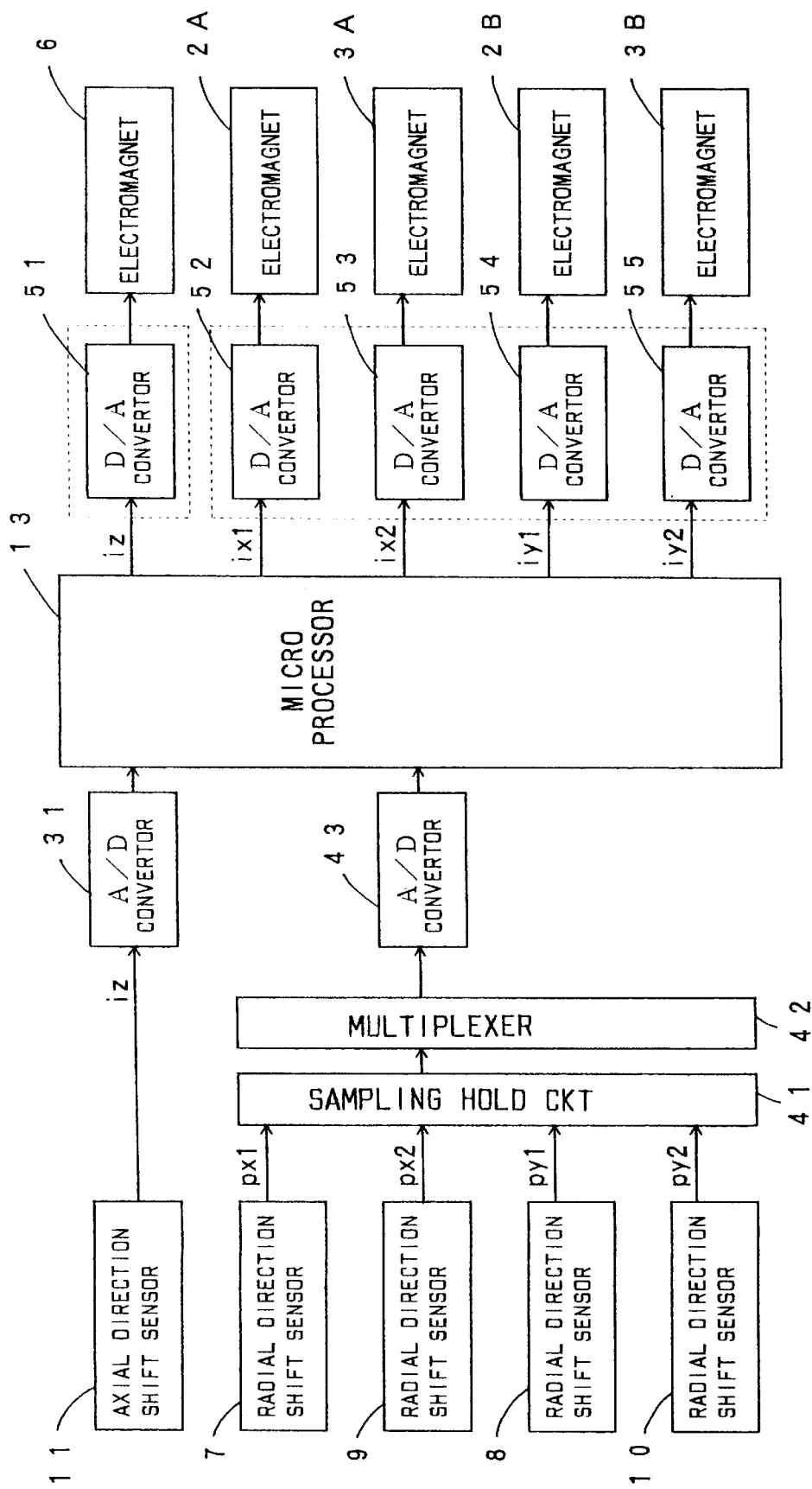
F I G. 6

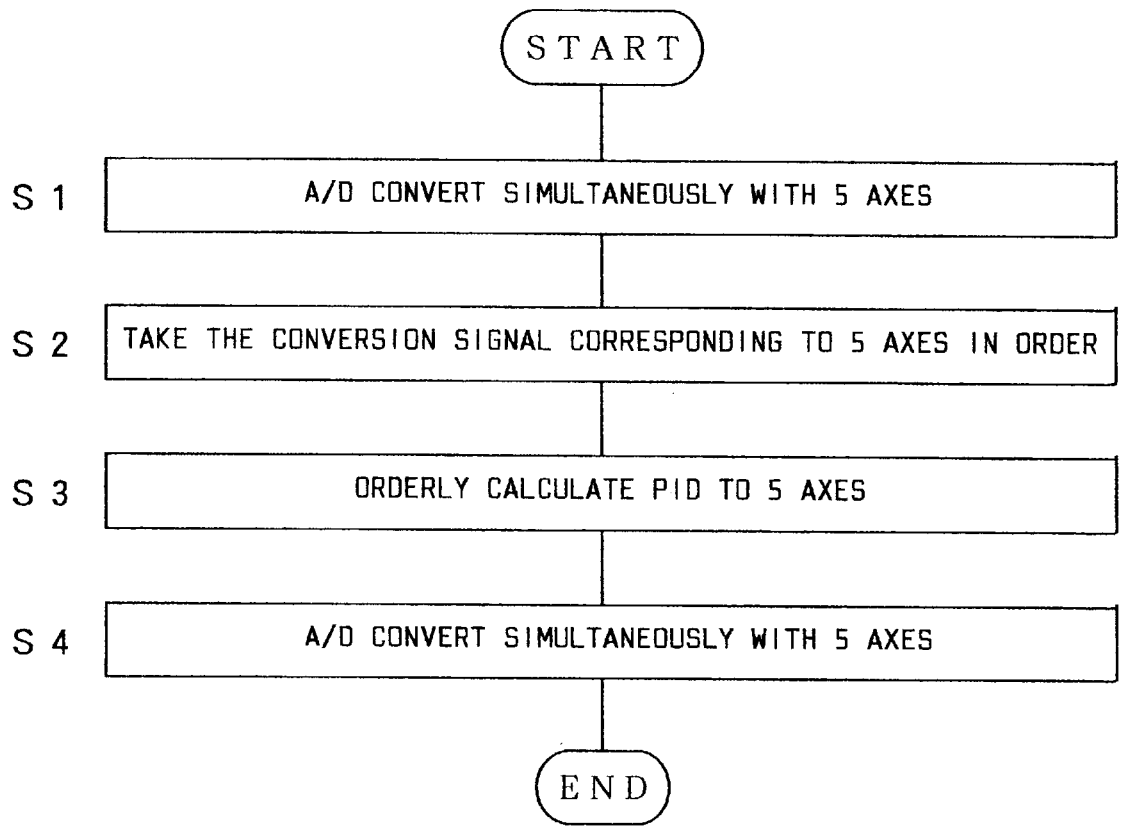
F I G. 1 0

5,923,559

MAGNETIC BEARING APPARATUS

TECHNICAL FIELD OF THE INVENTION

The present invention relates to a magnetic bearing apparatus which may be applied to a main shaft of a turbo molecular pump or a machine tool.

BACKGROUND OF THE INVENTION

FIG. 7 is a schematic view showing an overall concept of a magnetic bearing apparatus which is of a conventional five axis control type.

In the conventional magnetic bearing apparatus, a pair of right and left radial bearings 2 and 3 for a rotor 1 are disposed and a thrust bearing 4 is disposed on the right side. The radial bearing 2 is structured so that stationary electromagnets 2A and 2B radially attract a cylindrical rotor ferric core 1A mounted on the rotor 1 and magnetically bear the rotor 1 in the radial direction at its center. Also, the radial bearing 3 is structured so that stationary electromagnets 3A and 3B radially attract a cylindrical rotor ferric core 1B mounted on the rotor 1 and magnetically bear the rotor 1 in the radial direction at its center. Furthermore, the thrust bearing 4 is structured so as to magnetically receive the rotor 1 in the axial direction under the condition that a circular rotary ferric core 5 is attracted by electromagnets 6 on the right and left sides.

A radial shift sensor 7 for detecting a shift of the rotor 1 in a direction of an X-axis (X1) at a portion of the radial bearing 2 and a radial shift sensor 8 for detecting a shift of the rotor 1 in a direction of a Y-axis (Y1) at the portion of the radial bearing 2 are disposed in the portion of the radial bearing 2. Also, a radial shift sensor 9 for detecting a shift of the rotor 1 in a direction of an X-axis (X2) at a portion of the radial bearing 3 and a radial shift sensor 10 for detecting a shift of the rotor 1 in a direction of a Y-axis (Y2) at the portion of the radial bearing 3 are disposed in the portion of the radial bearing 3. Furthermore, an axial direction shift sensor 11 for detecting a shift of the rotor 1 in a Z-axis direction is disposed at a position facing an end face of the rotor 1.

FIG. 8 shows a control system for the conventional magnetic bearing apparatus shown in FIG. 7.

The control system for the magnetic bearing apparatus is provided with a microprocessor 13 for performing a calculation process, to be described later, for controlling the magnetically floated position of the rotor 1 to the centers or the like of the magnetic bearings 2 and 3. A/D (analog/digital) convertors 14 to 18 are connected on an input side of the microprocessor 13. The axial direction shift sensor 11 and radial direction shift sensors 7, 9, 8 and 10 are connected to the A/D convertors 14 to 18, respectively. Also, D/A (digital/analog) convertors 19 to 23 are connected on an output side of the microprocessor 13. The electromagnets 6, 2A, 3A, 2B and 3B are connected to the D/A convertors 19 to 23, respectively.

The operation of the conventional magnetic bearing apparatus having such an arrangement will now be described with reference to FIGS. 10 and 11.

In this case, after the rotor 1 has been magnetically lifted by the radial bearings 2 and 3 and the thrust bearing 4, when an electric power is supplied to a coil of a motor stator (not shown), the rotor 1 is brought into a rotative condition. Then, in accordance with the commands of the microprocessor 13, the A/D conversions of the detected shift signal pz of the axial direction shift sensor 11 concerning the Z-axis direction of the rotor 1 and the detected shift signals px1, px2, py1 and py2 of the radial direction shift sensors 7, 9, 8 and 10 concerning the Y-axis and X-axis of the rotor 1 are started by the A/D convertors 14 to 18 simultaneously all in the five axes (step 1). When this A/D conversion has been completed, the converted signals corresponding to the five axes are orderly entered into the microprocessor 13 (step 2), and the microprocessor 13 seeks the current command value iz of the electromagnet 6 concerning the control in the Z-axis, and the respective current command values px1, px2, py1 and py2 of the electromagnets 2A, 3A, 2B and 3B concerning the control of the X-axis and Y-axis (step 3) by a given calculation process.

When the calculation process has been completed in the microprocessor 13, the respective calculated current command values iz, px1, px2, py1, and py2 are simultaneously fed to the associated D/A convertors 19 to 23 and are D/A converted (step 4). The magnetic forces of the respective electromagnets 6, 2A, 3A, 2B and 3B are controlled so that the rotor 1 is located in a target position.

Next, an example of the calculation process of the microprocessor 13 is shown in FIG. 9.

Considering the momentum equation of the rotor 1 which is to be controlled in the conventional five axis control type magnetic bearing apparatus, it seems that the Z-axis is independent of X-axis and Y-axis, respectively. However, it is impossible that to consider that the X-axis and the Y-axis are independent of each other because of the mutual interference. Accordingly, in the calculation process of the microprocessor 13, the cross feedback is attained between the X-axis and the Y-axis. At the same time, the process is carried out independently of the one input/one output system 24 for processing the calculation in the Z-axis and the four input/four output system 25 for processing the calculation in the X- and Y-axes.

Namely, the shift signal pz that has been A/D converted in the A/D convertor 14 is subjected to a proportional differentiating/integrating calculation process in a PID (proportional integrating/differentiating) circuit 131, so that the current command value iz of the electromagnet 6 may be sought.

On the other hand, the shift signals px1 and px2 that have been A/D converted in the A/D convertors 15 and 16 are fed to the adder 132 and the subtracter 133. The output signal of the adder 132 is fed to the PID circuit 134, and the output signal of the subtracter 131 is fed to the PID circuit 135. The output signal of the PID circuit 134 is fed to the adder 136 and the subtracter 137, and the output signal of the PID circuit 135 is fed to the adder 136 and the subtracter 137 through the adder 138. Also, the output signal of the adder 133 is fed to the subtracter 145 while being multiplied by a constant K by the compensation circuit 139.

Furthermore, the shift signals py1 and py2 that have been A/D converted in the A/D convertors 17 and 18 are fed to the subtracter 141 and the adder 142, and the output signal of the subtracter 141 is fed to the PID circuit 143, and the output signal of the adder 142 is fed to the PID circuit 144. The output signal of the PID circuit 143 is fed to the adder 146 and the subtracter 147 through the subtracter 145. The output signal of the PID circuit is fed to the adder 146 and the subtracter 147. Also, the output signal of the subtracter 141 is fed to the adder 138 while being multiplied by a constant K by the compensation circuit 140.

By the way, in the case where the control system for the magnetic bearing apparatus is composed of a microprocessor as described above, in order to enhance the control performance, as shown in FIG. 11, it is necessary to shorten a process time for signals per one cycle of the microprocessor (i.e., sampling time) as much as possible. For this reason, it is necessary to use the A/D convertors which have a short conversion time (high speed type). In the conventional technology, high speed convertors have been used for all the A/D convertors 14 to 18.

However, the shorter the conversion time of the A/D convertors and higher the speed thereof, in general, the more expensive the convertors are. Accordingly, there is a problem that the more the number of the expensive A/D convertors, the more expensive the manufacturing cost for the control system of the magnetic bearing apparatus.

Furthermore, it is necessary to consider the increase in the manufacturing cost of the magnetic bearing apparatus due not only to the A/D convertors 14 to 18 but also due to the D/A convertors 19 to 23 on the output side of the microprocessor.

The present invention overcomes the foregoing drawbacks in the conventional art.

It is an object of the present invention to provide a magnetic bearing apparatus having a control system which can be manufactured at a low manufacturing cost as compared to the conventional art.

Another object of the present invention is to provide a magnetic bearing apparatus which operates without deterioration in control performance.

BRIEF SUMMARY OF THE INVENTION

The foregoing and other objects of the present invention are attained by a magnetic bearing apparatus comprising a rotor, a radial direction electromagnet for magnetically supporting the rotor in a radial direction, an axial direction electromagnet for magnetically supporting the rotor in an axial direction, an axial direction shift detecting device for detecting a shift of the rotor in the axial direction, and a radial direction shift detecting device for detecting a shift of the rotor in the radial direction. An axial direction A/D conversion device converts a shift signal corresponding to the shift of the rotor in the axial direction detected by the axial direction shift detecting device to a digital signal at a first conversion speed. A radial direction A/D conversion device converts a shift signal corresponding to the shift of the rotor in the radial direction detected by the radial direction shift detecting device at a second conversion speed different from the first conversion speed. A calculation device calculates control currents in accordance with a predetermined calculation on the basis of the shift signals subjected to A/D conversion by the axial direction A/D conversion device and the radial direction A/D conversion device for controlling the axial and radial direction electromagnets to magnetically support the rotor in the axial and radial directions at a preselected target position.

Preferably, the axial direction A/D conversion device comprises one A/D convertor, and the radial direction A/D conversion device comprises a plurality of A/D convertors. The radial direction A/D convertors preferably have a lower conversion speed than that of the axial direction A/D convertor.

A second embodiment of the magnetic bearing apparatus according to the present invention comprises a rotor, a radial direction electromagnet for magnetically supporting the rotor in a radial direction, an axial direction electromagnet for magnetically supporting the rotor in an axial direction, an axial direction shift detecting device for detecting a shift of the rotor in the axial direction, and a radial direction shift detecting device for detecting shifts of the rotor in a radial direction. An axial direction A/D conversion device converts a shift signal corresponding to the shift of the rotor in the axial direction detected by the axial direction shift detecting device to a digital signal. A radial direction A/D conversion device sequentially converts shift signals corresponding respectively to the shifts of the rotor in the radial direction detected by the radial direction shift detecting device while maintaining the shift signals for a constant period of time. A storage device stores the shift signals subjected to A/D conversion by the radial direction A/D conversion device. A calculation device calculates respective control currents in accordance with a predetermined calculation on the basis of the shift signals stored in the storage device and the shift signals subjected to A/D by the axial direction A/D conversion device.

In another embodiment, the magnetic bearing apparatus according to the present invention comprises a rotor, a radial direction electromagnet for magnetically supporting the rotor in a radial direction, an axial direction electromagnet for magnetically supporting the rotor in an axial direction, an axial direction shift detecting device for detecting a shift of the rotor in the axial direction, and a radial direction shift detecting device for detecting a shift of the rotor in a radial direction. An axial direction A/D conversion device converts a shift signal corresponding to the shift of the rotor in the axial direction detected by the axial direction shift detecting device to a digital signal. A radial direction A/D conversion device converts a shift signal corresponding to the shift of the rotor in the radial direction detected by the radial direction shift detecting device. A calculation device calculates control currents in accordance with a predetermined calculation on the basis of the shift signals subjected to A/D conversion by the axial direction A/D conversion device and the radial direction A/D conversion device to respectively control the axial direction electromagnet and the radial direction electromagnet. An axial direction D/A conversion device converts the control current of the axial direction electromagnet calculated by the calculation device to an analog signal at a first conversion speed. A radial direction D/A conversion device converts the control current of the radial direction electromagnet calculated by the calculation means to an analog signal at a second conversion speed different from the first conversion speed.

BRIEF DESCRIPTION OF THE DRAWINGS

FIG. 3 is an illustration for illustrating an operational timing of the magnetic bearing apparatus according to the present invention;

FIG. 6 is a block diagram showing still another embodiment of the control system of the magnetic bearing apparatus of the present invention;

FIG. 10 is a flowchart for illustrating the operation of the conventional magnetic bearing apparatus shown in FIGS. 8.

DETAILED DESCRIPTION OF THE EMBODIMENTS

A best mode of the embodiments of the invention will now be described in detail with reference to FIGS. 1 to 6.

Figure 1:
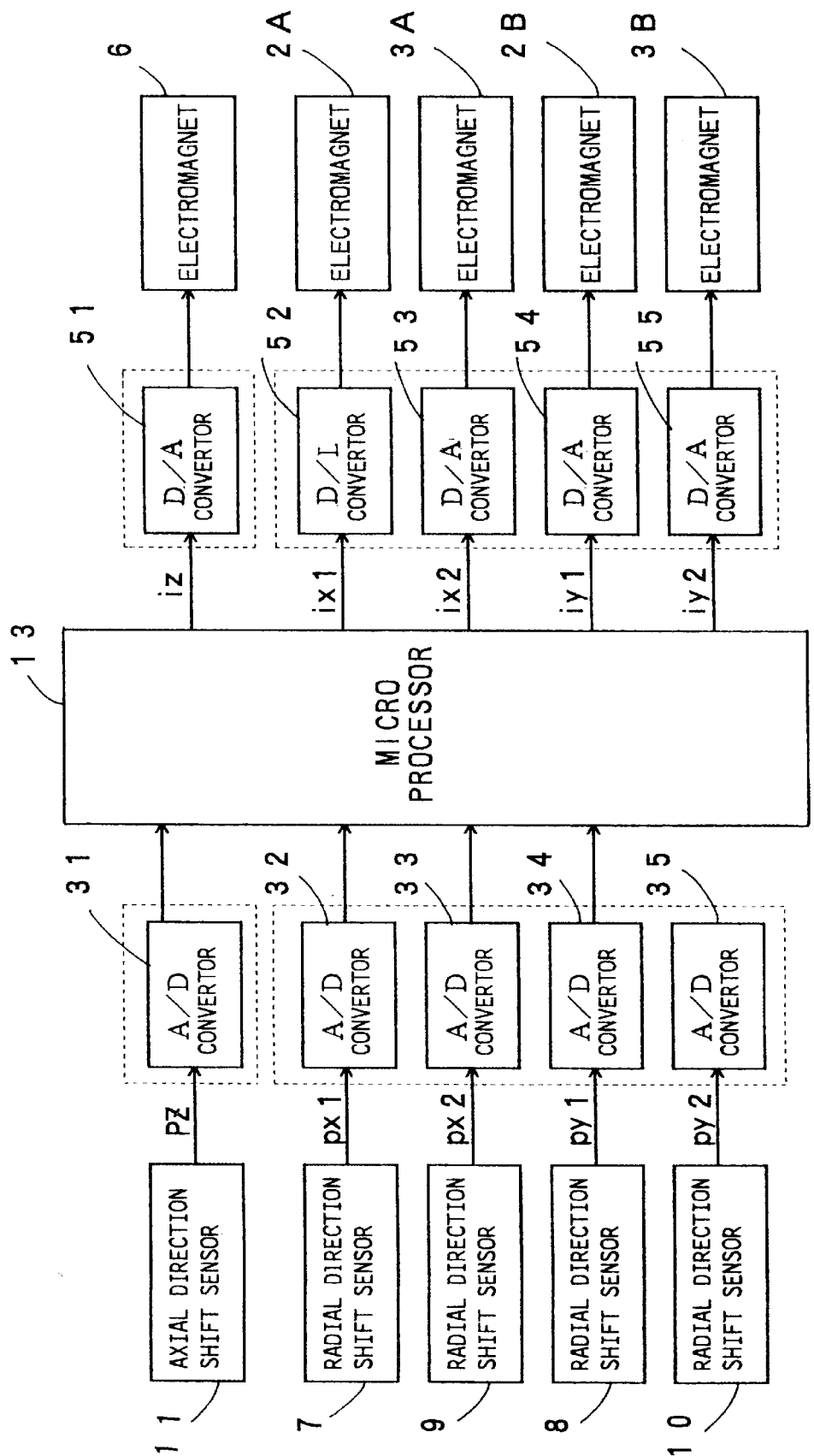
FIG. 1 is a block diagram showing a structure of a control system for a magnetic boring apparatus according to the present invention.
Figure 2:
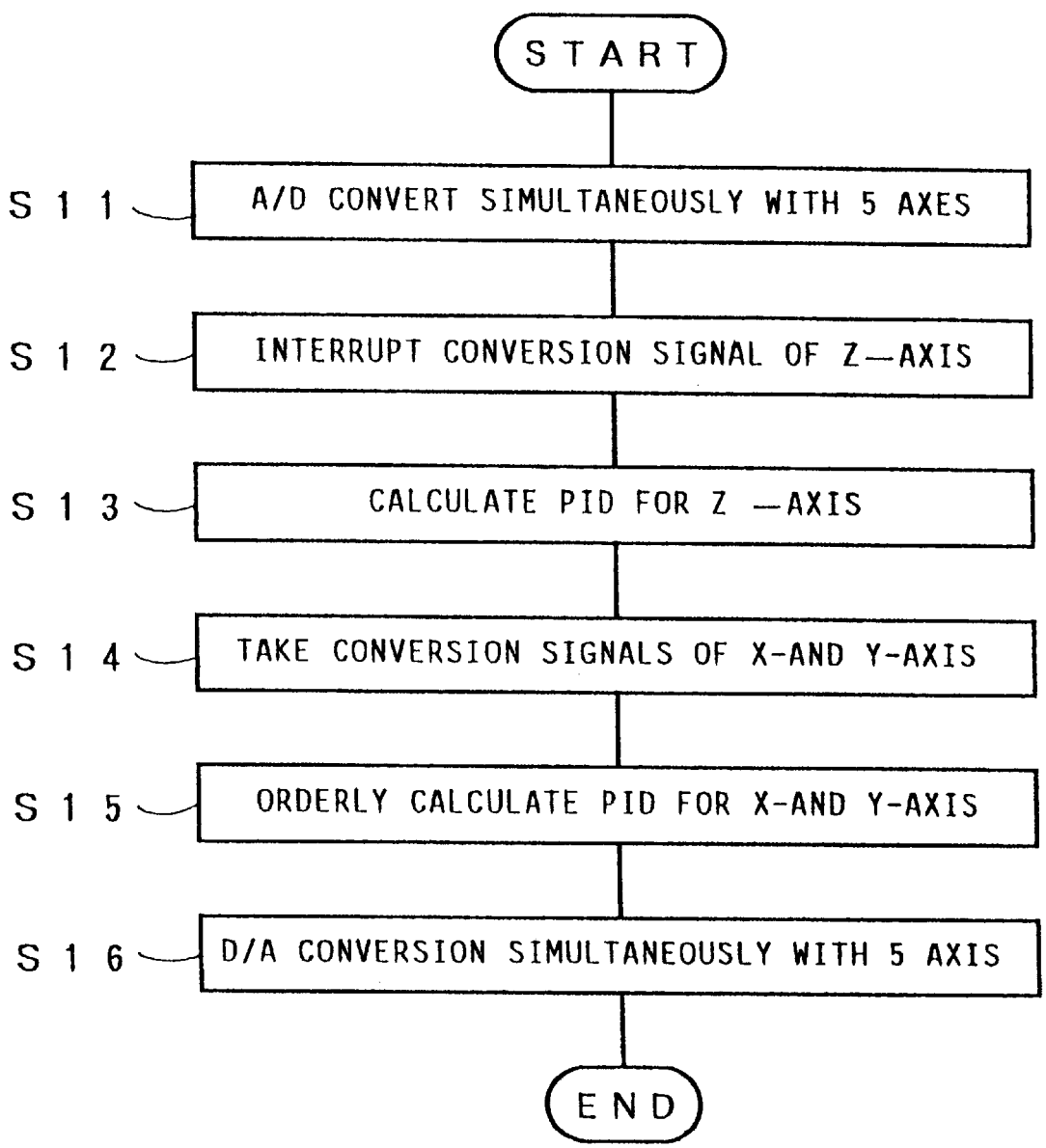
FIG. 2 is a flowchart for illustrating an operation of the magnetic bearing apparatus according to the present invention.

FIG. 1 is a block diagram showing a structure of a control system for a magnetic bearing apparatus according to an embodiment of the invention. FIG. 2 is a flowchart for illustrating an operation of the same magnetic bearing apparatus. FIG. 3 is an illustration for illustrating an operational timing of the same magnetic bearing apparatus.

Figure 7:
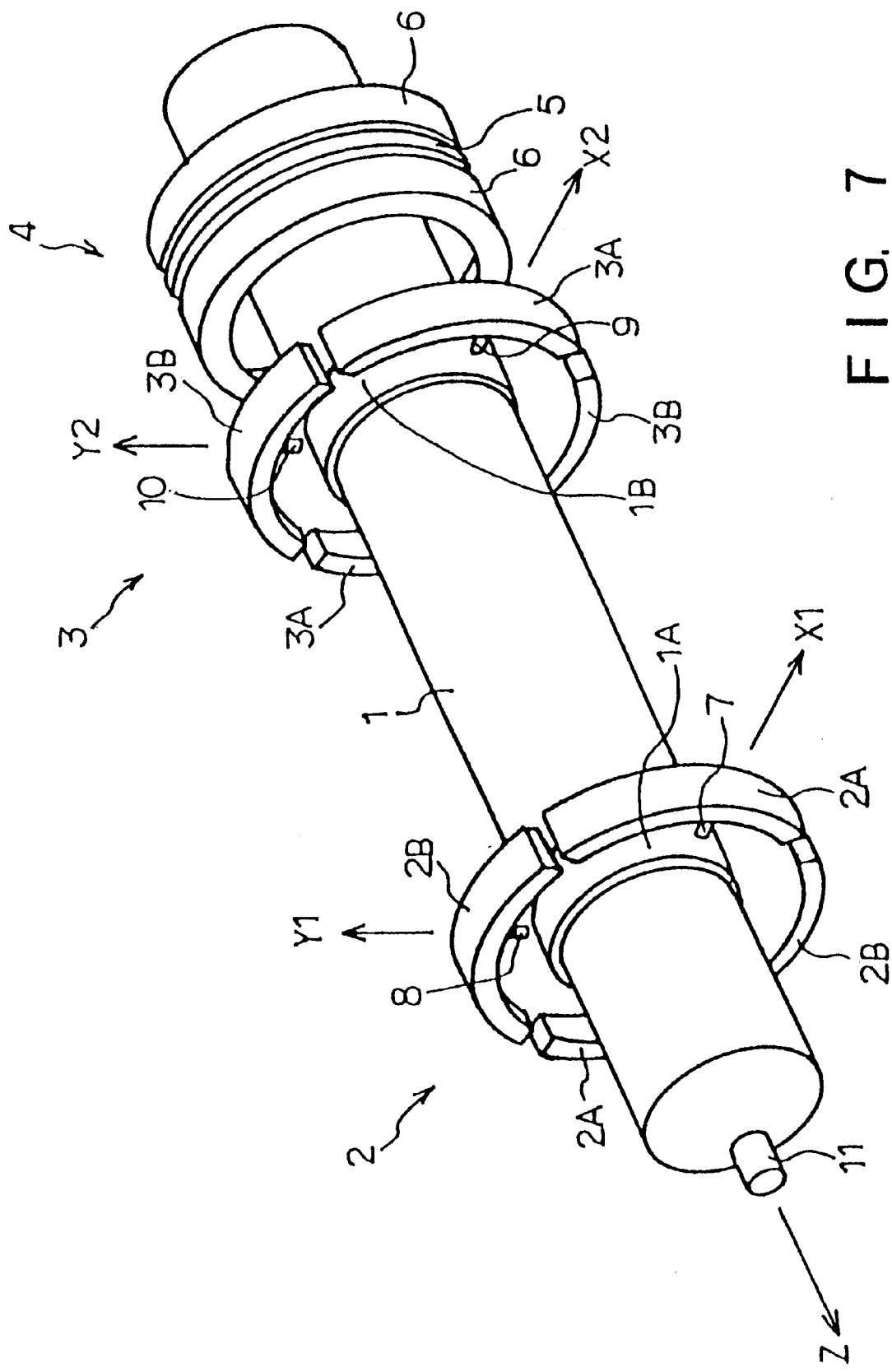
FIG. 7 is a schematic perspective view showing a structure of a conventional magnetic bearing apparatus.
Figure 8:
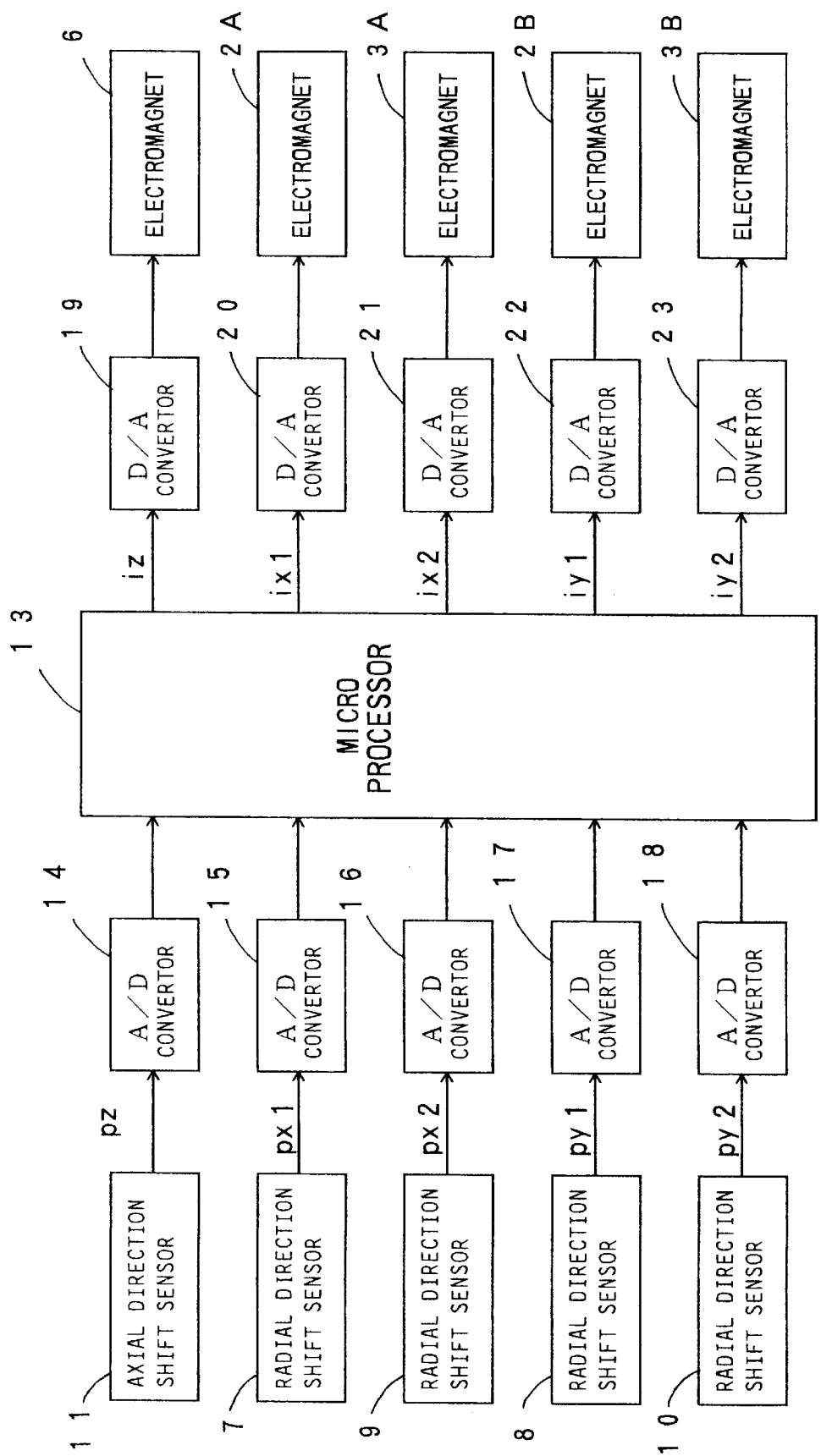
FIG. 8 is a block diagram showing a structure of a control system for the conventional magnetic bearing apparatus.

Since the mechanical structure of the magnetic bearing apparatus is the same as that shown in FIG. 7, its explanation will be omitted and the structure will be explained by using FIG. 7.

The control system of the magnetic bearing apparatus according to the present invention is provided with a microprocessor 13 for processing a predetermined calculation, to be described later, for controlling a magnetically floating position of a rotor 1 to a center or the like of magnetic bearings 2 and 3. As shown in FIG. 1, a high speed A/D convertor 31 having a short conversion time is connected to the input side of the microprocessor 13, and an axial direction shift sensor 11 is connected to the A/D convertor 31. Also, four low speed A/D convertors 32, 33, 34 and 35 that have a longer conversion time than that of the A/D convertor 31 are connected, respectively, to the input side of the microprocessor 13, and axial direction shift sensors 7, 9, 8 and 10 are connected to the A/D convertors 32, 33, 34 and 35.

Thus, the high speed one is used as the A/D convertor 31 for A/D converting the detected shift signal of the axial direction shift sensor 11 concerning the Z-axis direction of the rotor 1, and low speed ones that have the longer conversion time than that of the A/D convertor 31 are used as the A/D convertors 32, 33, 34 and 35 for A/D converting the respective shift signals of the axial direction shift sensors 7, 9, 8 and 10 concerning the X- and Y-axis of the rotor 1. The reason for this is as follows. Namely, in the calculation process of the microprocessor 13, as described above, the calculation process of the Z-axis direction of the rotor 1 and the calculation process of the X- and Y-axis of the rotor 1 may be carried out independently of each other, and in both calculations, it is possible to differentiate the timing for taking the conversion signals.

Also, as shown in FIG. 1, a relatively expensive D/A convertor 51 that may attain the high speed D/A conversion is connected to the output side of the microprocessor 13, and an electromagnet 6 is connected to the output side of the D/A convertor 51. Also, four relatively less expensive D/A convertors 52 to 55 which have lower speed conversions than that of the D/A convertor 51 are connected, respectively, to the output side of the microprocessor 13, and electromagnets 2A, 3A, 2B and 3B are connected, respectively, to the output sides of the D/A convertors 52 to 55.

The reason for the foregoing is that, since the high speed one is used as the D/A convertor 51 for operating the electromagnet 6 and the low speed ones are used as the D/A convertors 52 to 55 for operating the electromagnets 2A, 3A, 2B and 3B, it is not always necessary to carry out simultaneously the control of the electromagnet 6 concerning Z-axis direction of the rotor 1 and the control of the electromagnets 2A, 3A, 2B and 3B concerning the X- and Y-axis direction of the rotor 1.

Next, the operation of the magnetic bearing apparatus according to the present invention will be described with reference to FIGS. 2 and 3.

In this case, after the rotor 1 has been magnetically lifted by the radial bearings 2 and 3 and the thrust bearing 4, when an electric power is supplied to a coil of a motor stator (not shown), the rotor 1 is brought into a rotative condition. Then, in accordance with the commands of the microprocessor 13, the A/D conversions of the detected shift signal pz of the axial direction shift sensor 11 concerning the Z-axis direction of the rotor 1 and the detected shift signals px1, px2, py1 and py2 of the radial direction shift sensors 7, 9, 8 and 10 concerning the Y-axis and X-axis of the rotor 1 are started simultaneously all in the five axes (step 11) by the respective A/D convertors 31 to 35.

When this high speed A/D conversion of the A/D convertor 31 has been completed, the converted signals (digital values) are entered into the microprocessor 13 (step 12). The current command value iz of the electromagnet 6 concerning the Z-axis is calculated by a predetermined calculation process (step 13). Subsequently, when the calculation process concerning the Z-axis direction has been completed, the A/D conversion is performed in parallel to the calculation process of the Z-axis. At the same time, the respective conversion signals from the A/D convertors 32, 33, 34 and 35, which have already been subjected to the conversion are simultaneously inputted to the microprocessor 13 (step 14).

The microprocessor 13 calculates the respective current command values px1, px2, py1 and py2 of the electromagnets 2A, 3A, 2B and 3B concerning the control of the X-axis and Y-axis in accordance with the inputted conversion signals (step 15). When the calculation process has been completed in the microprocessor 13, the respective calculated current command values iz, px1, px2, py1, and py2 are simultaneously fed to the associated D/A convertors 51 to 55 and are D/A converted (step 16). The magnetic forces of the respective electromagnets 6, 2A, 3A, 2B and 3B are controlled so that the rotor 1 is located in a target position.

Figure 9:
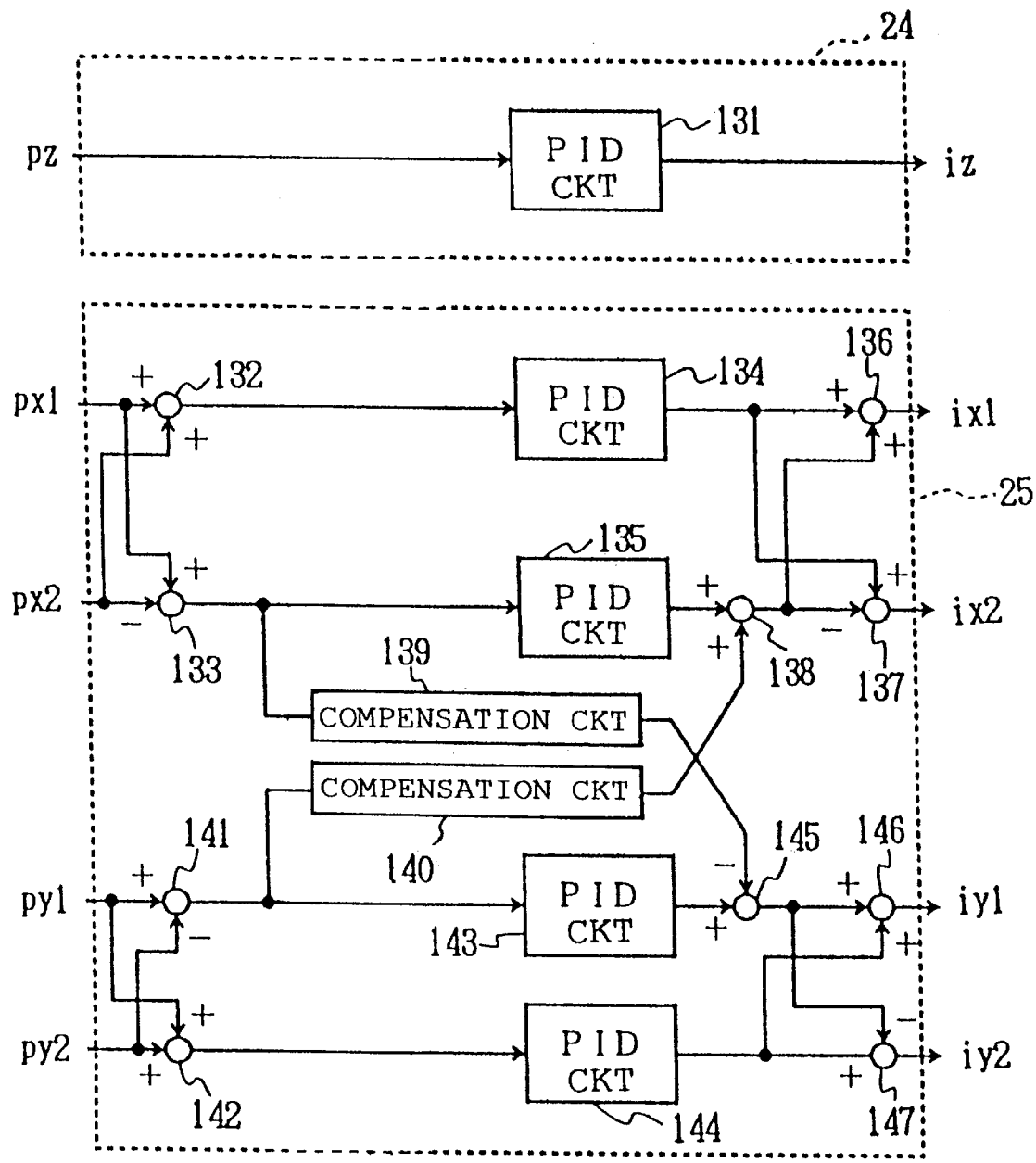
FIG. 9 is a view showing one example of a calculation process of a microprocessor.
Figure 11:
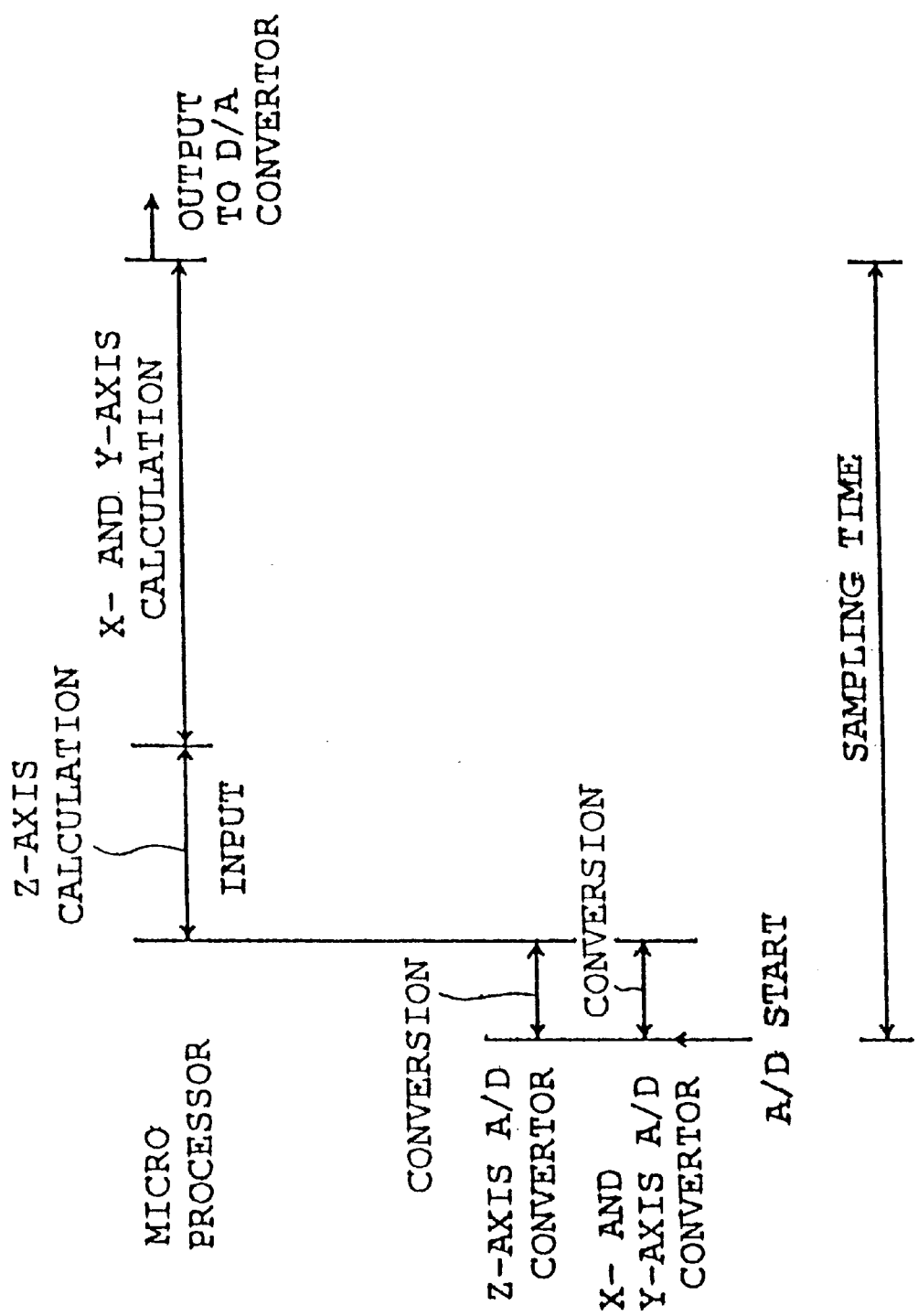
FIG. 11 is an illustration of the operational timing of the conventional magnetic bearing apparatus shown in FIG. 8.

The above-described calculation process of the microprocessor 13 may be carried out in accordance with the process shown in FIG. 9 but may be based on a control according to a current control theory in which the PID compensation as shown in FIG. 9 is not carried out. The present invention is not limited to any specific control method.

In the foregoing embodiment, a high speed A/D converter having a short conversion time is used as the A/D convertor 31, and at the same time, less expensive A/D convertors having longer A/D conversion times than that of the A/D convertor 31 are used as the larger number of the A/D convertors 32, 33, 34 and 35. The signal that has been A/D converted for a short period of time in the high speed A/D convertor 31 is calculated and processed in advance in the microprocessor 13. Meanwhile in the calculation process, the low speed A/D convertors 32, 33, 34 and 35 perform the A/D conversions. Accordingly, in the embodiment, since it is possible to maintain the sampling time in the same manner as in the conventional system, it is possible to reduce the manufacturing cost without any loss of the control performance.

Also, in the embodiment, since a relatively expensive A/D convertor is used as the D/A convertor 51 and relatively less expensive A/D convertor are used as the larger number of the D/A convertors 52 to 55, it is possible to contribute to the reduction in manufacturing cost. Incidentally, it is possible to use the low speed one as the D/A convertor 51 and to use the high speed ones as the D/A convertor 52 to 55.

In the foregoing embodiment, the explanation has been made as to the case where the high speed one is used as the A/D convertor 31 and the lower speed ones than the A/D convertor 31 are used as the A/D convertors 32 to 35. However, the present invention utilizes the characteristics that it is possible to perform the calculation process in the Z-axis direction and the calculation process in the X- and Y-axis direction independently of each other in the calculation process of the microprocessor 13, and in addition, in both calculation processes, it is possible to differentiate the timing for inputting the process signals. Accordingly, inversely to the above-described case, it is possible to use the low speed one as the A/D convertor 31 and to use the high speed ones as the A/D convertors 32 to 35.

Another embodiment of a control system for a magnetic bearing apparatus according to the invention will now be described with reference to FIGS. 4 and 5.

Figure 4:
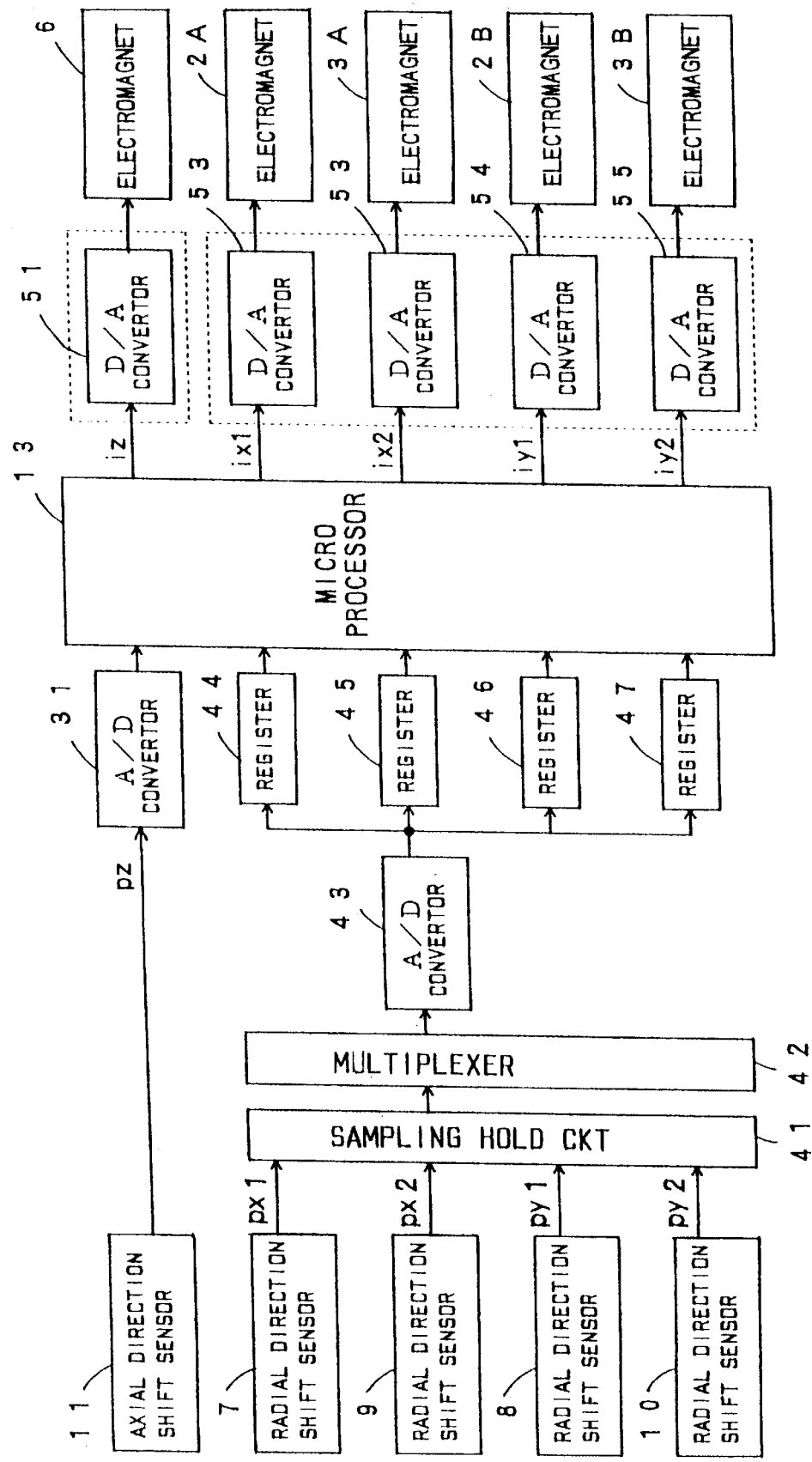
FIG. 4 is a block diagram showing another embodiment of the control system for the magnetic bearing apparatus of the present invention.

FIG. 4 shows the embodiment of the control system for the magnetic bearing apparatus. FIG. 5 is an illustration of the operational timing of the same control system.

In the control system for the magnetic bearing apparatus, the four A/D convertors 32 to 35 in the embodiment shown in FIG. 1 are replaced by a sample hold circuit 41, a multiplexer 42, a high speed A/D convertor 43 and four registers 44 to 47. Then, the respective output sides of the radial direction shift sensors 7, 9, 8 and 10 are connected to the input side of the sample hold circuit 41, and at the same time, the respective output sides of the registers 44 to 47 are connected to the input side of the microprocessor 13. Since the other structure of the embodiment is substantially the same as that of the embodiment shown in FIG. 1, the same reference numerals are used to indicate the like parts. The explanation therefor will be omitted.

In the thus arranged control system of the embodiment shown in FIG. 4, in accordance with the commands of the microprocessor 13, the A/D conversion of the detected shift signal pz of the axial direction shift sensor 11 is started by the A/D convertor 31, and at the same time, the respective detected shift signals px1, px2, py1 and py2 of the radial direction shift sensors 7, 9, 8 and 10 are simultaneously fed to the sample hold circuit 41. In the sample hold circuit 41, the input values of the respective shift signals are maintained for a constant period of time. The multiplexer 42 feeds the respective signals, held in the sample hold circuit 41, to the A/D convertor 43 in order. Thus, as shown in FIG. 5, the respective signals that have been A/D converted by the A/D convertor 43 are orderly stored into the registers 44 to 47.

Figure 5:
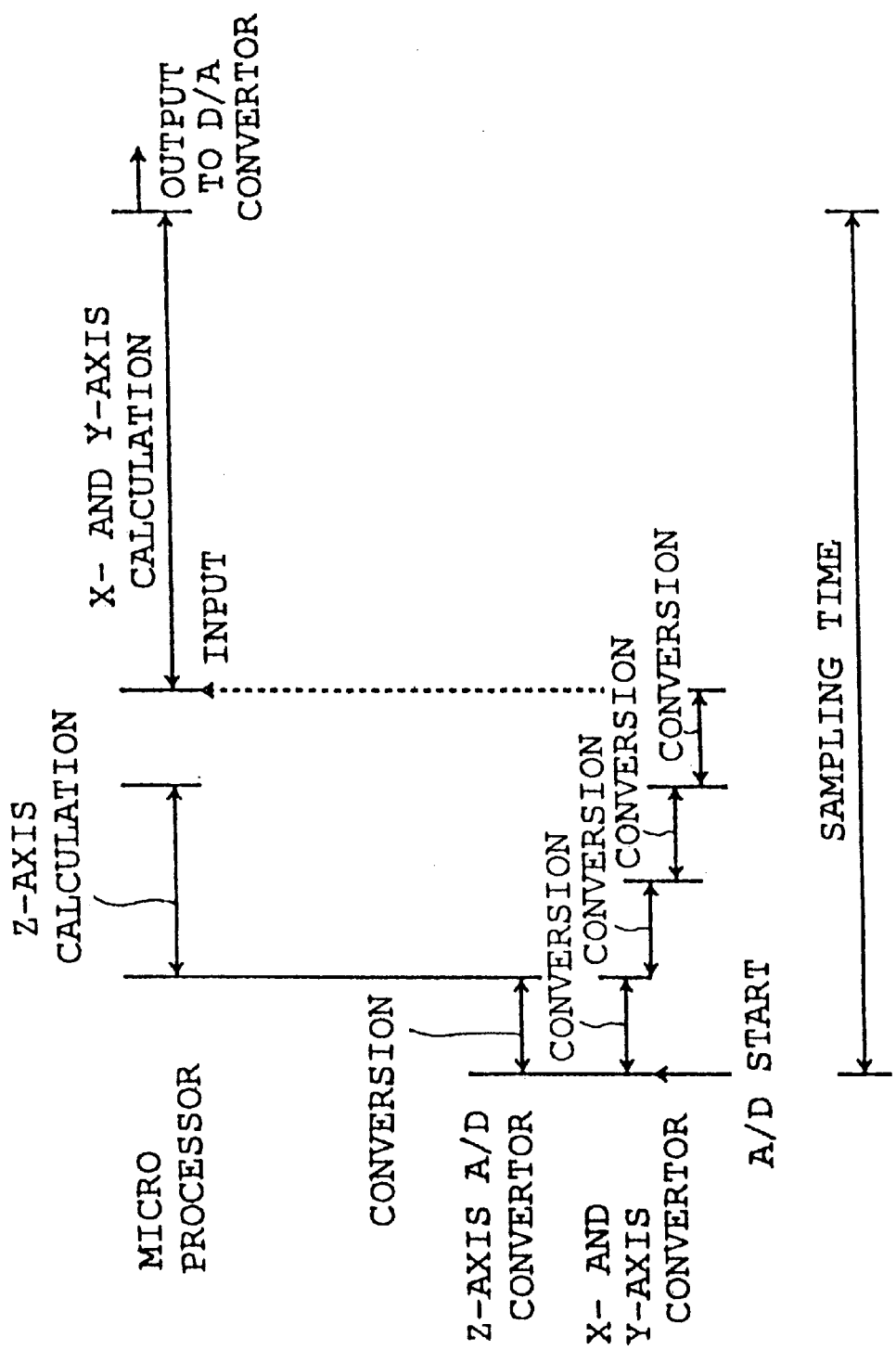
FIG. 5 is an illustration of the operational timing of the control system shown in FIG. 4.

On the other hand, in parallel to the A/D conversion of the A/D convertor 43, as shown in FIG. 5, the conversion signals which have been subjected to the A/D conversion in the A/D convertor 31 are inputted into the microprocessor 13 so that the current command value iz of the electromagnet 11 concerning the Z-axis is sought by a predetermined calculation process.

Thereafter, when all the A/D conversions have been completed in the A/D convertor 43, the conversion signals to be stored in the registers 44 to 47 are simultaneously inputted into the microprocessor 13 (see FIG. 5). The microprocessor 13 executes a predetermined calculation process in accordance with the conversion signals that have been inputted thereinto, to thereby seek the respective current command values px1, px2, py1 and py2. When the calculation process in the microprocessor 13 has been completed, the respective calculated current command values iz, px1, px2, py1 and py2 are simultaneously fed to the associated D/A convertors 51 to 55 and are D/A converted. Thus, the magnetic forces of the respective electromagnets 6, 2A, 3A, 2B and 3B are controlled so that the rotor 1 is located in a target position.

In the foregoing embodiment, in comparison with the embodiment shown in FIG. 1, the number of the parts of the whole system is increased, but it is possible to reduce, from four to one, the number of the A/D convertors which are relatively expensive in unit cost. It is therefore possible to realize the reduction in manufacturing cost as a whole while suppressing the degradation in the control performance to a minimum level.

Another embodiment of a control system for a magnetic bearing apparatus according to the invention will now be described with reference to FIG. 6.

FIG. 6 shows the embodiment of the control system for the magnetic bearing apparatus.

In the control system for the magnetic bearing apparatus, the four registers 44 to 47 in the embodiment shown in FIG. 4 are omitted, and the A/D conversion signal in the A/D convertor 43 is inputted in accordance with an interrupt process during the calculation process of the Z-axis by the microprocessor 13. Since the other structure of the embodiment is substantially the same as that of the embodiment shown in FIG. 4, the same reference numerals are used to indicate the like parts. The explanation therefor will be omitted.

In the thus arranged control system in the embodiment shown in FIG. 6, in accordance with the commands of the microprocessor 13, the A/D conversion of the detected shift signal pz of the axial direction shift sensor 11 is started by the A/D convertor 31, and at the same time, the respective detected shift signals px1, px2, py1 and py2 of the radial direction shift sensors 7, 9, 8 and 10 are simultaneously fed to the sample hold circuit 41. In the sample hold circuit 41, the input values of the respective shift signals are maintained for a constant period of time. The multiplexer 42 the respective signals, held in the sample hold circuit 41, to the A/D convertor 43 in order.

The conversion signal that has been subjected to the A/D conversion in the A/D convertor 31 is inputted into the microprocessor 13, and the process for searching the current command value iz of the electromagnet 11 concerning the Z-axis in accordance with a predetermined calculation process is started.

Thereafter, when the initial A/D conversion has been completed in the A/D convertor 43, the conversion signal is inputted into the microprocessor 13 by the interrupt process. When the interrupt process has been completed, the microprocessor 13 again starts the interrupted process for searching the current command value iz of the electromagnet concerning the Z-axis. In accordance with the interrupt process, the conversion signal that is to be A/D converted in the A/D convertor 43 is inputted into the microprocessor 13 whenever the conversion has been completed.

When the input operation of the conversion signal from the A/D convertor 43 in accordance with the interrupt process has been completed, the microprocessor 13 performs a predetermined calculation process in accordance with the inputted conversion signal so as to seek the respective current command values px1, px2, py1 and py2 of the electromagnets 2A, 3A, 2B and 3B concerning the X- and Y-axes. When the calculation process by the microprocessor 13 has been finished, the respective calculated current command values iz, px1, px2, py1 and py2 are simultaneously fed to the associated D/A convertors 51 to 55. Thus, the magnetic forces of the respective electromagnets 6, 2A, 3A, 2B and 3B are controlled so that the rotor 1 is located in a target position.

In accordance with the foregoing embodiment, in comparison with the embodiment shown in FIG. 4, since the four registers may be omitted, it is possible to reduce the manufacturing cost corresponding to the reduction of the registers.

Incidentally, in the foregoing explanation, the magnetic bearing apparatus according to the embodiments is of a five axis control type. However, it is possible to apply the invention also to a three axis control type magnetic bearing apparatus.

INDUSTRIAL APPLICABILITY

According to the present invention, the conversion speed is differentiated between the axial direction A/D conversion means and the radial direction A/D conversion means, the conversion signal which has been completed earlier out of these two A/D conversion means is first processed, and during this process, the other A/D conversion means performs the A/D conversion. Accordingly, it is possible to reduce the manufacturing cost without deteriorating the control performance. Furthermore, since the larger number of the radial direction A/D conversion means may be low speed and less expensive ones, it is possible to more effectively realize the above-described effect.

Also, since a plurality of detected shifts detected by the radial direction shift detecting means are maintained for a constant period of time and are A/D converted in order, it is possible to reduce, to one, the number of the A/D conversion means that are relatively expensive in unit cost, making it possible to reduce the manufacturing cost while suppressing the reduction in control ability to a minimum level.

Otherwise, since the conversion speed is differentiated between the axial direction D/A conversion means and the radial direction D/A conversion means and the less expensive one may be used as one of the D/A conversion means, it is possible to reduce the manufacturing cost.

I claim:

1. A magnetic bearing apparatus comprising:
    a rotor;
    a radial direction electromagnet for magnetically supporting the rotor in a radial direction;
    an axial direction electromagnet for magnetically supporting the rotor in an axial direction;
    axial direction shift detecting means for detecting a shift of the rotor in the axial direction;
    radial direction shift detecting means for detecting a shift of the rotor in the radial direction;
    axial direction A/D conversion means for A/D converting at a first conversion speed a shift signal corresponding to the shift of the rotor in the axial direction detected by the axial direction shift detecting means;
    radial direction A/D conversion means for A/D converting at a second conversion speed a shift signal corresponding to the shift of the rotor in the radial direction detected by the radial direction shift detecting means, the second conversion speed being different from the first conversion speed; and
    calculation means for calculating control currents in accordance with a predetermined calculation on the basis of the shift signals subjected to A/D conversion by the axial direction A/D conversion means and the radial direction A/D conversion means for controlling the axial and radial direction electromagnets to magnetically support the rotor in the axial and radial directions at a preselected target position.

2. A magnetic bearing apparatus according to claim 1; wherein the axial direction A/D conversion means comprises one A/D convertor, and the radial direction A/D conversion means comprises a plurality of A/D convertors; and wherein the radial direction A/D convertors have a lower conversion speed than that of the axial direction A/D convertor.

3. A magnetic bearing apparatus according to claim 1; wherein the first conversion speed is higher than the second conversion speed.

4. A magnetic bearing apparatus comprising:
    a rotor;
    a radial direction electromagnet for magnetically supporting the rotor in a radial direction;
    an axial direction electromagnet for magnetically supporting the rotor in an axial direction;
    axial direction shift detecting means for detecting a shift of the rotor in the axial direction;
    radial direction shift detecting means for detecting a plurality of shifts of the rotor in a radial direction;
    axial direction A/D conversion means for A/D converting a shift signal corresponding to the shift of the rotor in the axial direction detected by the axial direction shift detecting means;
    radial direction A/D conversion means for sequentially A/D converting a plurality of shift signals corresponding respectively to the plurality of shifts of the rotor in the radial direction detected by the radial direction shift detecting means while maintaining the plurality of shift signals for a constant period of time;
    storage means for storing the plurality of shift signals subjected to A/D conversion by the radial direction A/D conversion means; and
    calculation means for calculating respective control currents in accordance with a predetermined calculation on the basis of the shift signals stored in the storage means and the shift signals subjected to A/D conversion by the axial direction A/D conversion means.

5. A magnetic bearing apparatus comprising:
    a rotor;
    a radial direction electromagnet for magnetically supporting the rotor in a radial direction;
    an axial direction electromagnet for magnetically supporting the rotor in an axial direction;
    axial direction shift detecting means for detecting a shift of the rotor in the axial direction;
    radial direction shift detecting means for detecting a shift of the rotor in a radial direction;
    axial direction A/D conversion means for A/D converting a shift signal corresponding to the shift of the rotor in the axial direction detected by the axial direction shift detecting means;
    radial direction A/D conversion means for A/D converting a shift signal corresponding to the shift of the rotor in the radial direction detected by the radial direction shift detecting means;
    calculation means for calculating control currents in accordance with a predetermined calculation on the basis of the shift signals subjected to A/D conversion by the axial direction A/D conversion means and the radial direction A/D conversion means to respectively control the axial direction electromagnet and the radial direction electromagnet;

axial direction D/A conversion means for D/A converting at a first conversion speed the control current of the axial direction electromagnet calculated by the calculation means; and radial direction D/A conversion means for D/A converting at a second conversion speed the control current of the radial direction electromagnet calculated by the calculation means, the second conversion speed being different from the first conversion speed.

6. A magnetic bearing apparatus according to claim 5; wherein the first conversion speed is higher than the second conversion speed.

7. A magnetic bearing apparatus comprising:

first magnetic bearing means for levitating a rotary body by magnetic attraction forces in an axial direction thereof;

second magnetic bearing means for levitating the rotary body by magnetic attraction forces in a radial direction thereof;

first detecting means for detecting axial displacement of the rotary body and outputting a first detection signal corresponding to the detected axial displacement of the rotary body;

second detecting means for detecting radial displacement of the rotary body and outputting second detection signals corresponding to the detected radial displacement of the rotary body;

first A/D conversion means for converting the first detection signal to a first digital signal at a first conversion speed;

second A/D conversion means for converting the second detection signals to second digital signals at a second conversion speed different from the first conversion speed; and calculating means for calculating control currents on the basis of the first and second digital signals for controlling the magnetic attraction forces of the first and second magnetic bearing means to levitate the rotary body in the axial and radial directions at a preselected target position.

8. A magnetic bearing apparatus according to claim 7; wherein the second detecting means comprises a plurality of second detectors.

9. A magnetic bearing apparatus according to claim 8; wherein the first A/D conversion means comprises one A/D converter, and the second A/D conversion means comprises a plurality of A/D converters respectively connected to the second detectors.

10. A magnetic bearing apparatus according to claim 7; further comprising storage means for storing the first and second digital signals outputted by the second A/D conversion means; and wherein the calculating means calculates the control currents on the basis of the first digital signal and the second digital signals stored in the storage means.

11. A magnetic bearing apparatus according to claim 10; wherein each of the first and second A/D conversion means comprises one A/D converter.

12. A magnetic bearing apparatus according to claim 10; wherein the first conversion speed is higher than the second conversion speed.

13. A magnetic bearing apparatus according to claim 7; wherein each of the first and second A/D conversion means comprises one A/D converter.

14. A magnetic bearing apparatus according to claim 7; wherein the first A/D conversion means comprises one A/D converter, and the second A/D conversion means comprises a plurality of A/D converters.

15. A magnetic bearing apparatus according to claim 7; wherein the first conversion speed is higher than the second conversion speed.

16. A magnetic bearing apparatus according to claim 7; wherein the second conversion speed is higher than the first conversion speed.

* * * * *